(12) United States Patent
Kubo

(10) Patent No.: US 10,493,566 B2
(45) Date of Patent: Dec. 3, 2019

(54) MACHINE LEARNING DEVICE, MACHINE LEARNING SYSTEM, AND MACHINE LEARNING METHOD

(71) Applicant: FANUC CORPORATION, Yamanashi (JP)

(72) Inventor: Yoshitaka Kubo, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 0 days.

(21) Appl. No.: 16/050,252

(22) Filed: Jul. 31, 2018

(65) Prior Publication Data
US 2019/0061062 A1 Feb. 28, 2019

(30) Foreign Application Priority Data
Aug. 28, 2017 (JP) .................. 2017-163735

(51) Int. Cl.
*G06K 9/62* (2006.01)
*B23K 26/70* (2014.01)
(Continued)

(52) U.S. Cl.
CPC .......... *B23K 26/705* (2015.10); *B23K 31/006* (2013.01); *G06T 7/001* (2013.01);
(Continued)

(58) Field of Classification Search
CPC .... B23K 26/705; B23K 31/006; G06T 7/001; G06T 2207/20081; G06T 2207/20084; G06T 2207/20076
See application file for complete search history.

(56) References Cited

U.S. PATENT DOCUMENTS 6,167,003 A * 12/2000 Haneji ................... G11B 7/093
369/53.11
2002/0126352 A1 * 9/2002 Shake ............... H04B 10/07953
398/34
(Continued)

FOREIGN PATENT DOCUMENTS

CN 107009031 8/2017
JP 63-269588 11/1988
(Continued)

OTHER PUBLICATIONS

Office Action dated Oct. 8, 2019 in Chinese Application No. 201810975964.6.

*Primary Examiner* — Samir A Ahmed
(74) *Attorney, Agent, or Firm* — Wenderoth, Lind & Ponack, L.L.P.

(57) ABSTRACT

Quality judgment on a laser beam intensity distribution is performed by taking an observation condition of the laser beam into consideration. A machine learning device includes: a state observing means that acquires data indicating an intensity distribution of a laser beam and data indicating a condition for observing the laser beam, performed to generate the data indicating the intensity distribution as input data; a label acquisition means that acquires an evaluation value related to judgment of the quality of the laser beam as a label; and a learning means that performs supervised learning using a pair of the input data acquired by the state observing means and the label acquired by the label acquisition means as training data to construct a learning model for judging the quality of the laser beam.

10 Claims, 8 Drawing Sheets

(51) Int. Cl.
  *G06T 7/00*     (2017.01)
  *B23K 31/00*    (2006.01)
(52) U.S. Cl.
  CPC ............ *G06T 2207/20076* (2013.01); *G06T 2207/20081* (2013.01); *G06T 2207/20084* (2013.01)

(56) References Cited

U.S. PATENT DOCUMENTS

| | | | |
|---|---|---|---|
| 2007/0000877 A1* | 1/2007 | Durr ................. | B23K 26/0643 219/121.7 |
| 2007/0211995 A1* | 9/2007 | Christensen ........... | G02B 6/264 385/43 |
| 2016/0123885 A1* | 5/2016 | Klipstein ................ | G01M 3/20 250/459.1 |
| 2016/0202164 A1* | 7/2016 | Trainer .............. | G01N 15/0211 |

FOREIGN PATENT DOCUMENTS

| | | |
|---|---|---|
| JP | 5-115992 | 5/1993 |
| JP | 5-337664 | 12/1993 |
| JP | 2007-44739 | 2/2007 |
| JP | 2015-166094 | 9/2015 |
| JP | 2017-131937 | 8/2017 |

* cited by examiner

MACHINE LEARNING DEVICE, MACHINE LEARNING SYSTEM, AND MACHINE LEARNING METHOD

This application is based on and claims the benefit of priority from Japanese Patent Application No. 2017-163735, filed on 28 Aug. 2017, the content of which is incorporated herein by reference.

BACKGROUND OF THE INVENTION

Field of the Invention

The present invention relates to a machine learning device, a machine learning system, and a machine learning method for performing machine learning regarding a laser beam.

Related Art

A laser beam radiated by a laser oscillator is sometimes not radiated properly due to reasons such as deterioration of an inner mirror resulting from long-term use or an inappropriate installation position of the inner mirror. Therefore, a user observes a laser beam after cleaning the mirror or replacing the mirror and performs quality judgment on the laser beam from the perspective of "whether a predetermined laser output is obtained" and "whether a satisfactory intensity distribution (beam mode shape) of the laser beam is obtained".

Here, the laser output can be measured by an ordinary laser power meter or a laser power probe. Therefore, the user can perform quality judgment on whether a predetermined laser output is obtained by referring to numerical data output as the measurement result.

In contrast, as for the laser beam intensity distribution, a laser beam having a rated output is radiated to a transparent acrylic resin for a predetermined period and a user performs quality judgment by referring to a burn pattern which is a burn mark. Alternatively, the user performs quality judgment by referring to an observation result obtained by a beam profiler.

A technique related to observation of the intensity distribution of a laser beam is disclosed in Patent Document 1. Specifically, Patent Document 1 discloses a configuration in which a laser beam is radiated to a target and a temperature distribution of the target is measured so that a variation in a beam profile of the laser beam during machining is detected immediately.

Patent Document 1: Japanese Unexamined Patent Application, Publication No. 2015-166094

SUMMARY OF THE INVENTION

However, if the observation conditions of laser beams are different, the appropriate intensity distributions of the laser beams are also different. For example, if the observation conditions such as the type of a laser oscillator, a temperature state of the laser oscillator, a radiation period of a laser beam, and the distance from a beam emitting aperture of the laser oscillator to an observation point of the intensity distribution are different, the appropriate intensity distributions of the laser beams are also different.

However, the technique disclosed in Patent Document 1 observes a change in the state of a laser beam with time under a predetermined observation condition, and does not take various observation conditions other than the predetermined observation condition into consideration. Moreover, it is difficult to take various observation conditions into consideration in judgment of the user using the burn pattern and the beam profiler.

Therefore, an object of the present invention is to provide a machine learning device, a machine learning system, and a machine learning method for performing quality judgment on a laser beam intensity distribution by taking an observation condition of the laser beam into consideration.

(1) A machine learning device (for example, a machine learning device 10 to be described later) of the present invention includes: a state observing means (for example, a state observation unit 11 to be described later) that acquires data indicating an intensity distribution of a laser beam and data indicating a condition for observing the laser beam, performed to generate the data indicating the intensity distribution as input data; a label acquisition means (for example, a label acquisition unit 12 to be described later) that acquires an evaluation value related to judgment of the quality of the laser beam as a label; and a learning means (for example, a learning unit 13 to be described later) that performs supervised learning using a pair of the input data acquired by the state observing means and the label acquired by the label acquisition means as training data to construct a learning model for judging the quality of the laser beam.

(2) The machine learning device according to (1) may be configured such that the data indicating the intensity distribution is image data obtained by imaging a laser receiving portion of a radiation target radiated with the laser beam.

(3) The machine learning device according to (2) may be configured such that the image data includes a plurality of pieces of image data obtained by imaging the laser receiving portion from a plurality of directions.

(4) The machine learning device according to (1) may be configured such that the data indicating the intensity distribution is generated by observing the laser beam using a beam profiler.

(5) The machine learning device according to any one of (1) to (4) may be configured such that the data indicating the condition for observing the intensity distribution includes at least any one of model information of a laser oscillator that radiates the laser beam, information on a temperature state of the laser oscillator, information indicating a radiation period of the laser beam, and information indicating a distance from a beam emitting aperture of the laser oscillator to an observation point of the intensity distribution.

(6) The machine learning device according to any one of (1) to (5) may be configured such that the evaluation value is determined on the basis of the judgment of a user referring to a laser receiving portion of a radiation target radiated with the laser beam or an observation result of the laser beam by a beam profiler.

(7) The machine learning device according to any one of (1) to (6) may be configured such that the laser beam is a laser beam used in a device associated with laser processing, and the learning means performs additional learning depending on an arrangement of a laser oscillator that radiates the laser beam, in the device associated with the laser processing.

(8) The machine learning device according to any one of (1) to (7) may be configured such that the laser beam is a laser beam used in a device associated with laser processing, and the learning model constructed by the learning means is a learning model that outputs a value of a probability indicating whether the laser beam satisfies predetermined criteria when the data indicating the intensity distribution of the laser beam and the data indicating the condition for observing the intensity distribution are used as the input data.

(9) A machine learning system (for example, a machine learning system 1 to be described later) of the present invention is a machine learning system including a plurality of machine learning devices according to any one of (1) to (8), and the learning means each included in the plurality of machine learning devices shares the learning model, and the learning means each included in the plurality of machine learning devices performs learning on the shared learning model.

(10) A machine learning method of the present invention is a machine learning method performed by a machine learning device (for example, a machine learning device 10 to be described later), including: a state observing step of acquiring data indicating an intensity distribution of a laser beam and data indicating a condition for observing the laser beam, performed to generate the data indicating the intensity distribution as input data; a label acquisition step of acquiring an evaluation value related to judgment of the quality of the laser beam as a label; and a learning step of performing supervised learning using a pair of the input data acquired in the state observing step and the label acquired in the label acquisition step as training data to construct a learning model for judging the quality of the laser beam.

According to the present invention, it is possible to perform quality judgment on a laser beam intensity distribution by taking an observation condition of the laser beam into consideration.

DETAILED DESCRIPTION OF THE INVENTION

Hereinafter, an embodiment of the present invention will be described in detail with reference to the drawings. Hereinafter, two embodiments of a first embodiment and a second embodiment will be described. Here, although the basic configuration of the respective embodiments is the same, the types of target laser beams of quality judgment are different. Specifically, in the first embodiment, quality judgment is performed on a carbon dioxide laser ($CO_2$ laser) on the basis of a burn pattern formed on an acrylic block. In contrast, in the second embodiment, quality judgment is performed on a YAG laser or a fiber laser on the basis of the output of a beam profiler.

Entire Configuration of Embodiment

Figure 1:
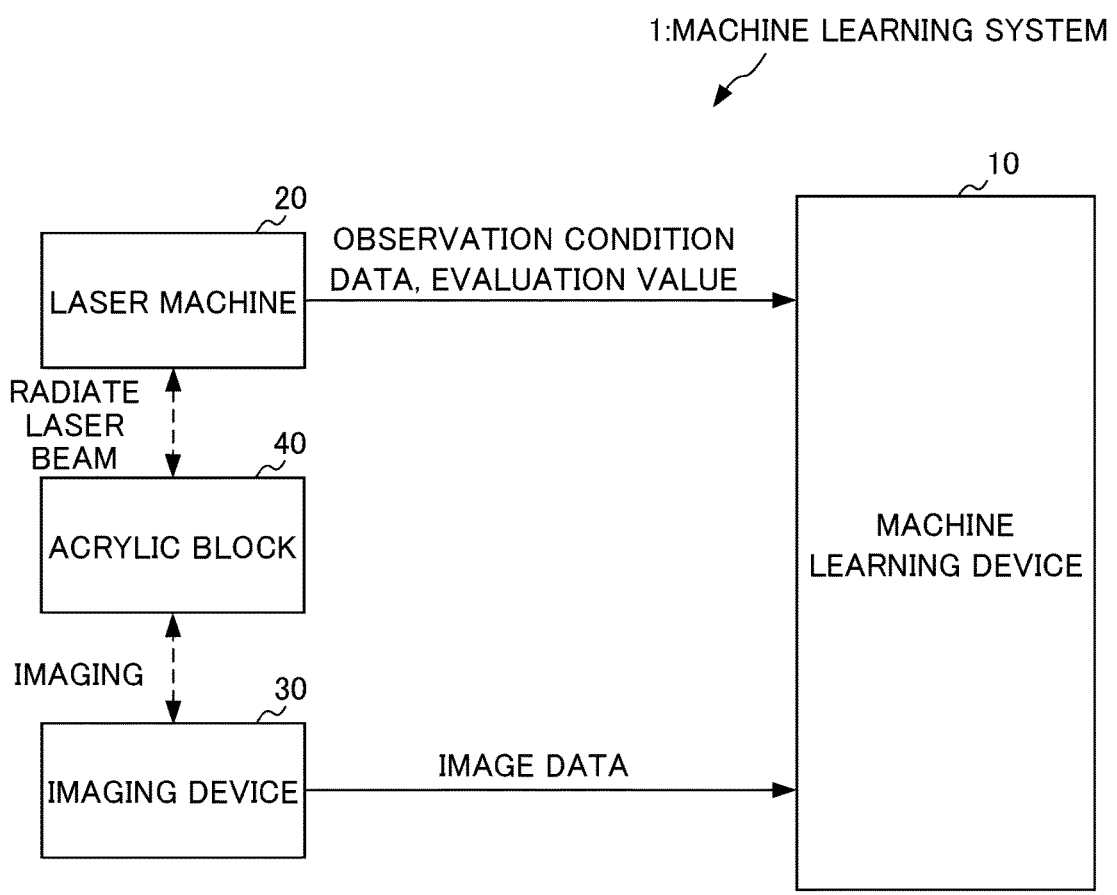
FIG. 1 is a functional block diagram illustrating an entire configuration of an embodiment of the present invention.

As illustrated in FIG. 1, a machine learning system 1 according to the present embodiment includes a machine learning device 10, a laser machine 20, and an imaging device 30. FIG. 1 also illustrates an acrylic block 40 used for forming a burn pattern.

These respective devices included in the machine learning system 1 are communicably connected. This communication may be performed directly between respective devices and may be performed via a network including a relay device. The network is realized, for example, by a local area network (LAN) constructed in a factory or a virtual private network (VPN) constructed on the Internet.

The machine learning device 10 is a device that performs machine learning regarding a laser beam to construct a learning model for performing quality judgment on an intensity distribution of the laser beam. The machine learning by the machine learning device 10 is performed by supervised learning using training data which uses image data obtained by imaging a burn pattern formed on the acrylic block 40 and a condition (hereinafter referred to as an "observation condition") for observation of the laser beam as input data and an evaluation value related to the quality judgment on the laser beam intensity distribution as a label.

In this manner, the machine learning device 10 performs supervised learning which uses the observation condition as well as the image data obtained by imaging the burn pattern as input data to construct a learning model. Due to this, the constructed learning model is a learning model capable of judging the quality of the laser beam by taking the observation condition of the laser beam into consideration. More specifically, the machine learning device 10 generates a plurality of pieces of training data by collecting a plurality of pieces of image data of the burn patterns formed, for example, under a first observation condition and repeatedly performs learning on the first observation condition on the basis of the plurality of pieces of training data to thereby construct a learning model capable of performing quality judgment of the first observation condition. Moreover, the machine learning device 10 generates a plurality of pieces of training data by collecting a plurality of pieces of image data of the burn patterns formed under a second observation condition. Moreover, the machine learning device 10 repeatedly performs learning on the second observation condition using the learning model learned for the first observation condition on the basis of the plurality of pieces of training data related to the second observation condition to thereby construct a learning model capable of performing quality judgment on the second observation condition as well as the first observation condition.

In the present embodiment, the machine learning device 10 can construct a learning model capable of performing the quality judgment on an observation condition similar to a learning target observation condition as well as the quality judgment on the learning target observation condition by repeatedly performing learning on various observation conditions in this manner. The details of a burn pattern forming method, the observation condition, and the evaluation value will be described with reference to FIG. 2 and the subsequent drawings.

The laser machine 20 is a device that performs predetermined laser processing. Although it depends on the configuration of the laser machine 20, the laser machine 20 may perform laser processing by itself and the laser machine 20 may perform the laser processing in cooperation with an external device such as a controller or a host device controlling the laser machine 20. In the following description, it is assumed that the laser machine 20 includes an external device such as a controller and a host device unless particularly stated otherwise.

The laser machine 20 receives the input of an observation condition and an evaluation value from a user in order to perform supervised learning. The laser machine 20 outputs the received observation condition and the evaluation value to the machine learning device 10. However, this configuration is an example only, and the machine learning device 10 may receive the observation condition and the evaluation value directly from the user rather than the laser machine 20 receiving the same and outputting the same to the machine learning device 10.

The imaging device 30 is a part that images a burn pattern on the acrylic block 40 to perform supervised learning. The imaging device 30 outputs image data generated by imaging the burn pattern to the machine learning device 10. The imaging device 30 is realized by an ordinary digital camera or a smartphone including a camera. Since a detailed configuration of the imaging device 30 is well known to those skilled in the art, a further detailed description thereof will be omitted.

Configuration of Laser Machine 20

Figure 2:
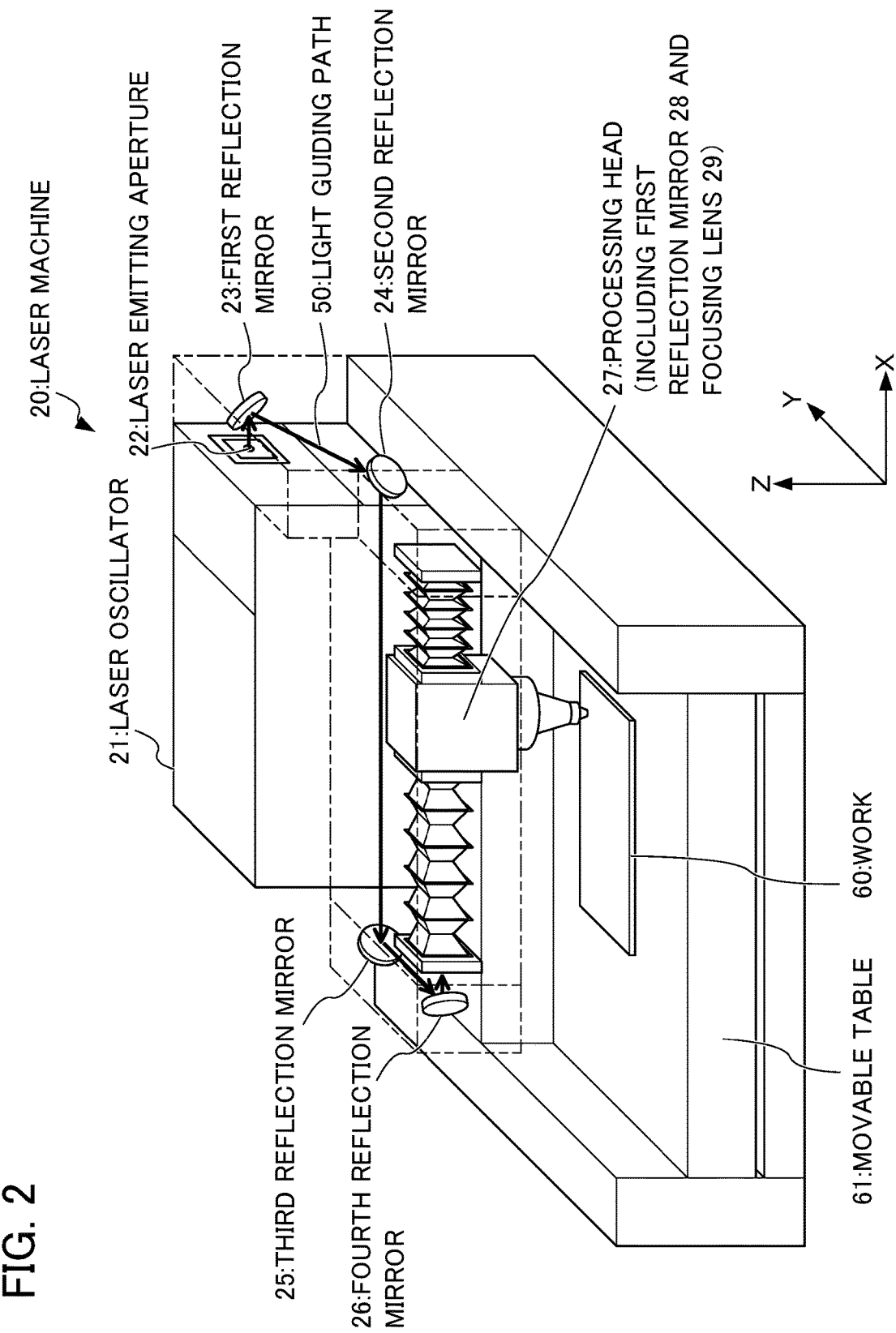
FIG. 2 is a perspective view schematically illustrating a configuration of a laser machine according to an embodiment of the present invention.

Next, a configuration of the laser machine 20 that radiates a laser beam which is a target of machine learning will be described with reference to FIG. 2. FIG. 2 is a perspective view illustrating a schematic configuration of the laser machine 20.

As illustrated in FIG. 2, the laser machine 20 includes a laser oscillator 21, a laser emitting aperture 22, a first reflection mirror 23, a second reflection mirror 24, a third reflection mirror 25, a fourth reflection mirror 26, a processing head 27, a fifth reflection mirror 28, and a focusing lens 29. In the drawing, a planar work 60 which is the target of laser processing by the laser machine 20 and a movable table 61 on which the work 60 is placed during laser processing are also illustrated. Hereinafter, these components will be described in detail. Illustrations and detailed description of a controller that controls the driving of the laser oscillator 21 and the movable table 61 in order to perform laser processing and the internal components of the laser oscillator 21 and the processing head 27 will be omitted because these components are not the subject matter of the present embodiment.

The laser oscillator 21 is a device that emits a laser beam having a circular cross-section from the laser emitting aperture 22 and includes a resonator, a laser medium, and an excitation light source in order to emit a laser beam. The laser oscillator 21 is a carbon dioxide laser. In the second embodiment to be described later, the laser oscillator 21 is a YAG laser or a fiber laser.

The laser beam emitted from the laser emitting aperture 22 is reflected from the respective reflection mirrors including the first, second, third, and fourth reflection mirrors 23, 24, 25, and 26 in that order and is incident on the processing head 27. That is, the laser beam emitted from the laser emitting aperture 22 is incident on the processing head 27 via a light guiding path 50 formed by the first, second, third, and fourth reflection mirrors 23, 24, 25, and 26.

A light guiding path cover for maintaining a satisfactory environment of the light guiding path 50 is provided around the light guiding path 50. However, the light guiding path cover is depicted perspectively as a broken line in order to clearly illustrate the light guiding path 50.

The processing head 27 has an approximately cylindrical shape so that a laser beam is radiated to the work 60. The processing head 27 includes the fifth reflection mirror 28 and the focusing lens 29. The fifth reflection mirror 28 reflects a laser beam incident on the processing head 27 in the direction (the Z-axis direction) of the work 60. The focusing lens 29 focuses the laser beam reflected from the fifth reflection mirror 28 to radiate the laser beam to the work 60 via a nozzle attached to a distal end of the processing head 27. In this way, a laser receiving portion of the work 60 is heated and melted by the laser beam whereby laser processing is realized.

Shape and Imaging of Burn Pattern

Next, a method of forming a burn pattern on the acrylic block 40 and a method of imaging the burn pattern will be described. The burn pattern may be formed by a user at an arbitrary timing and may be formed during periodic cleaning as will be described later, for example.

An internal mirror of an industrial laser oscillator is contaminated or deteriorated with aging. The absorptivity of a laser beam changes due to the contamination or deterioration and a desired performance is not obtained. Due to this, a user detaches the mirror periodically (for example, every several hundred to several thousand hours) to clean or replace the mirror component. Moreover, after cleaning or replacing the mirror component, the user attaches the mirror again. Due to an individual difference of mirrors, it is difficult to attach a mirror at the same position extremely accurately, for example with an error in micrometer units. Due to this, a unit that mounts a mirror inside the laser oscillator 21 has a mechanism for adjusting the installation position.

The user observes a laser beam radiated by the laser oscillator in order to judge an adjustment state of the installation position of a mirror by the adjustment mechanism and the deterioration state of the mirror. With this observation, the user performs quality judgment on whether a predetermined laser output is obtained and a satisfactory laser beam intensity distribution (beam mode shape) is obtained.

For example, the user uses the present embodiment in this quality judgment. For example, when a number of laser oscillators 21 are used in a similar manner in the same factory, the machine learning device 10 performs learning under the same observation condition whenever maintenance of the plurality of laser oscillators is performed. In this way, it is possible to collect a plurality of pieces of training data for the same observation condition and to construct a learning model. For example, a laser beam having a rated output is radiated to an acrylic block 40 formed of a transparent acrylic resin (for example, a rectangular parallelepiped acrylic block of 50 [mm] by 50 [mm] by 30 [mm]) for a predetermined period (for example, approximately 1 to 4 seconds depending on the output) and a burn pattern which is a burn mark is observed to perform quality judgment. Here, the acrylic resin is transparent in a visible light range but approximately 100% thereof is absorbed in a wavelength of 10.6 [μm] of the carbon dioxide laser. Due to this, when the carbon dioxide laser is radiated to the acrylic block 40 the acrylic resin gasifies instantly, and the burn mark can remain as a burn pattern.

Figure 3:
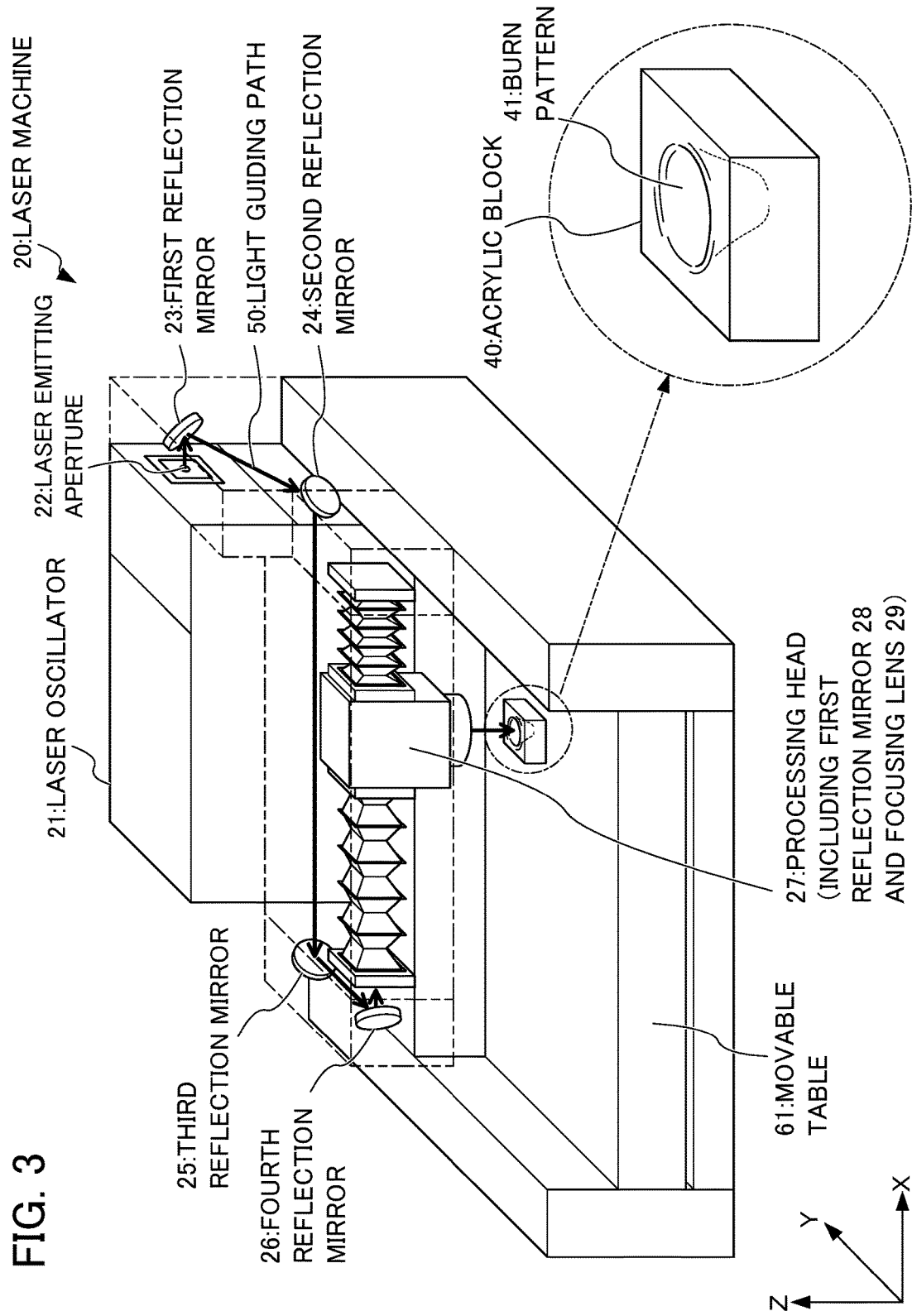
FIG. 3 is a perspective view schematically illustrating an example of generation of a burn pattern according to a first embodiment of the present invention.

Specific examples of a method of forming the burn pattern will be described with reference to FIGS. 3 and 4. FIG. 3 illustrates a first example of a burn pattern forming method. In this example, a user places the acrylic block 40 on the movable table 61 instead of the work 60. A laser beam is radiated to the acrylic block 40 in this state to form a burn pattern (corresponding to a burn pattern 41 in the drawing). In FIG. 3, the formed burn pattern is illustrated as a burn pattern 41. According to the method of the first example, it is possible to observe the laser beam itself for laser processing, radiated from the processing head 27 via the light guiding path 50.

Figure 4:
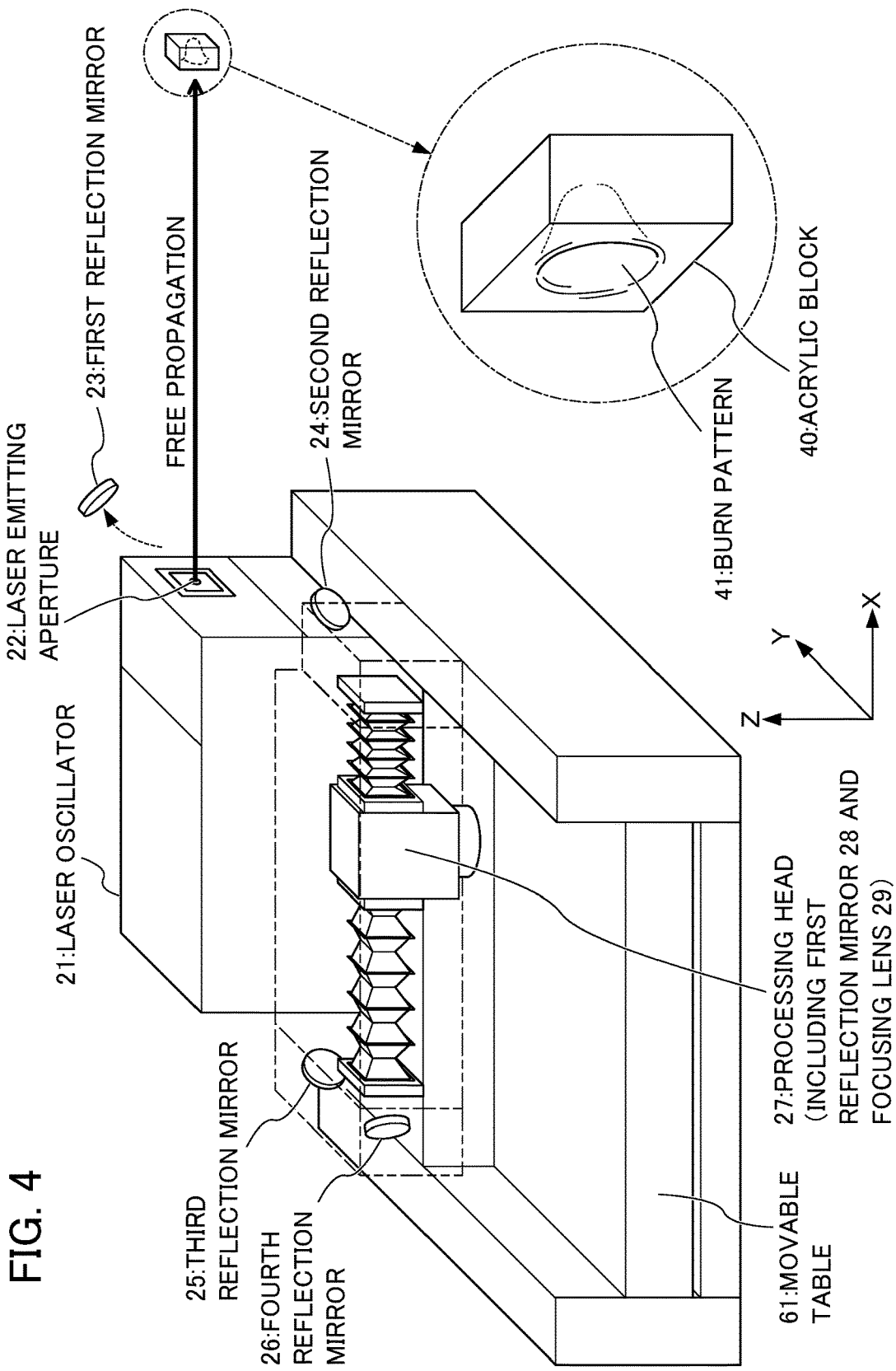
FIG. 4 is a perspective view schematically illustrating another example of generation of a burn pattern according to the first embodiment of the present invention.

FIG. 4 illustrates a second example of a burn pattern forming method. In this example, a user detaches the light guiding path cover and the first reflection mirror 23 that first reflects the laser beam emitted from the laser emitting aperture 22. In this state, the laser beam propagating freely after being emitted from the laser emitting aperture 22 is radiated to the acrylic block 40 to form a burn pattern (corresponding to the burn pattern 41 in the drawing). According to the method of the second example, it is possible to observe the laser beam itself emitted from the laser emitting aperture 22 before passing through the light guiding path 50.

These burn pattern forming methods are examples only and the burn pattern may be formed by other methods. For example, in the second example, the light guiding path cover and the third reflection mirror 25 rather than the first reflection mirror 23 may be detached and the burn pattern may be formed by the laser beam reflected from the first and second reflection mirrors 23 and 24.

As described above, in the present embodiment, machine learning is performed using the image data obtained by imaging the burn pattern as training data. Particularly, in an initial stage of machine learning, it is highly likely that machine learning can be achieved in a shorter period when learning is performed using a certain number of pieces of training data for the same observation condition rather than performing learning using training data for various observation conditions. Therefore, it may be desirable that the burn patterns are formed under the same observation condition.

For example, the distance from the laser emitting aperture 22 to the acrylic block 40 which is an observation point of the laser beam is controlled to be constant when the burn pattern is formed. For example, in the first example illustrated in FIG. 3, a controller (not illustrated) controls the processing head 27 and the movable table 61 in a manner similar to when laser processing is performed on the work 60 so that the distance from the laser emitting aperture 22 to the acrylic block 40 which is an observation point of the laser beam is constant. Moreover, for example, in the second example illustrated in FIG. 4, a user measures the distance from the laser emitting aperture 22 to the acrylic block 40 which is an observation point of the laser beam and installs the acrylic block 40 so that the distance is the same every time to thereby maintain a constant distance between the laser emitting aperture 22 and the acrylic block 40 which is an observation point of the laser beam.

When a carbon dioxide laser propagates in the air, if the density of $CO_2$ gas or an organic solvent component in the air is high, a divergence angle of the beam may increase. Therefore, the user ventilates the surroundings of the laser machine 20 sufficiently during forming of the burn pattern so that the burn pattern is formed under the same condition every time.

Next, how the burn pattern formed on the acrylic block 40 is imaged will be described. The user images the acrylic block 40 in three directions (for example, three orthogonal directions of X, Y, and Z axes) using the imaging device 30. In this way, the image data of the burn pattern is generated.

A user who performs a maintenance operation, for example, may perform imaging at the site where maintenance is performed. Moreover, since the acrylic block 40 can be carried easily, the user may carry the acrylic block 40 to an environment where imaging can be performed more easily than the site where maintenance is performed and then perform imaging.

Imaging of the acrylic block 40 is preferably performed under the same condition every time. Therefore, it is desirable that the positional relation between a camera lens included in the imaging device 30 and the acrylic block 40 is made constant using a jig capable of fixing the positional relation between the camera lens and the acrylic block 40. Moreover, the brightness or the like of the surroundings during imaging may be controlled to be constant.

Example of Burn Pattern

Next, a specific example of a burn pattern shape will be described. A burn pattern indicates an intensity distribution of a laser beam and the shape thereof changes on the basis of various factors.

For example, even when a laser beam is radiated by the same laser machine 20, the shape of a burn pattern is different depending on a warming state of the laser machine 20. In this regard, a beam mode in which the intensity distribution is observed from a beam-off state for a predetermined period (for example, three minutes) before radiation of a beam is referred to as a Cold mode. Moreover, a beam mode in which a shutter is closed before radiation of a beam and the intensity distribution is observed from a beam-on state for a predetermined period (for example, three minutes) is referred to as a Hot mode.

Figure 5:
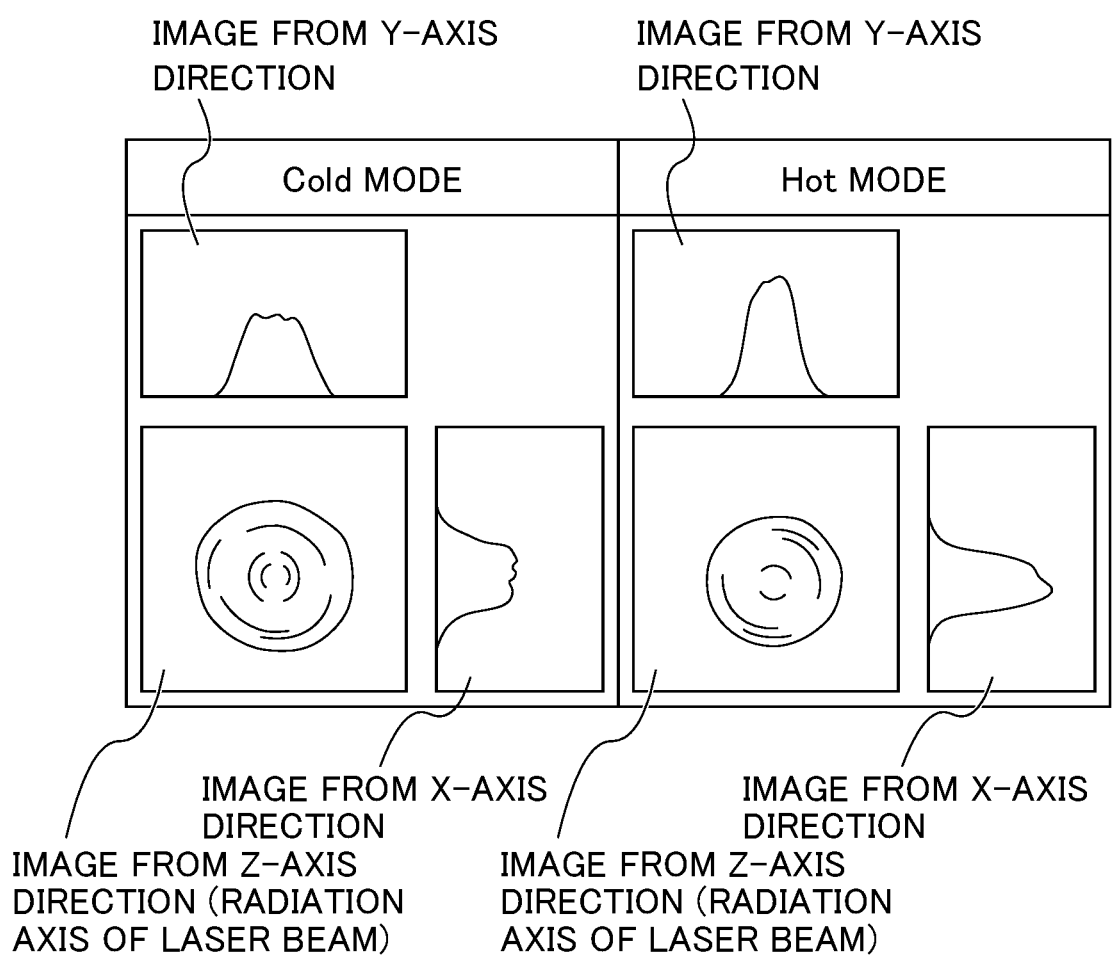
FIG. 5 is an image diagram illustrating an example of a burn pattern used as input data according to the first embodiment of the present invention.
Figure 6:
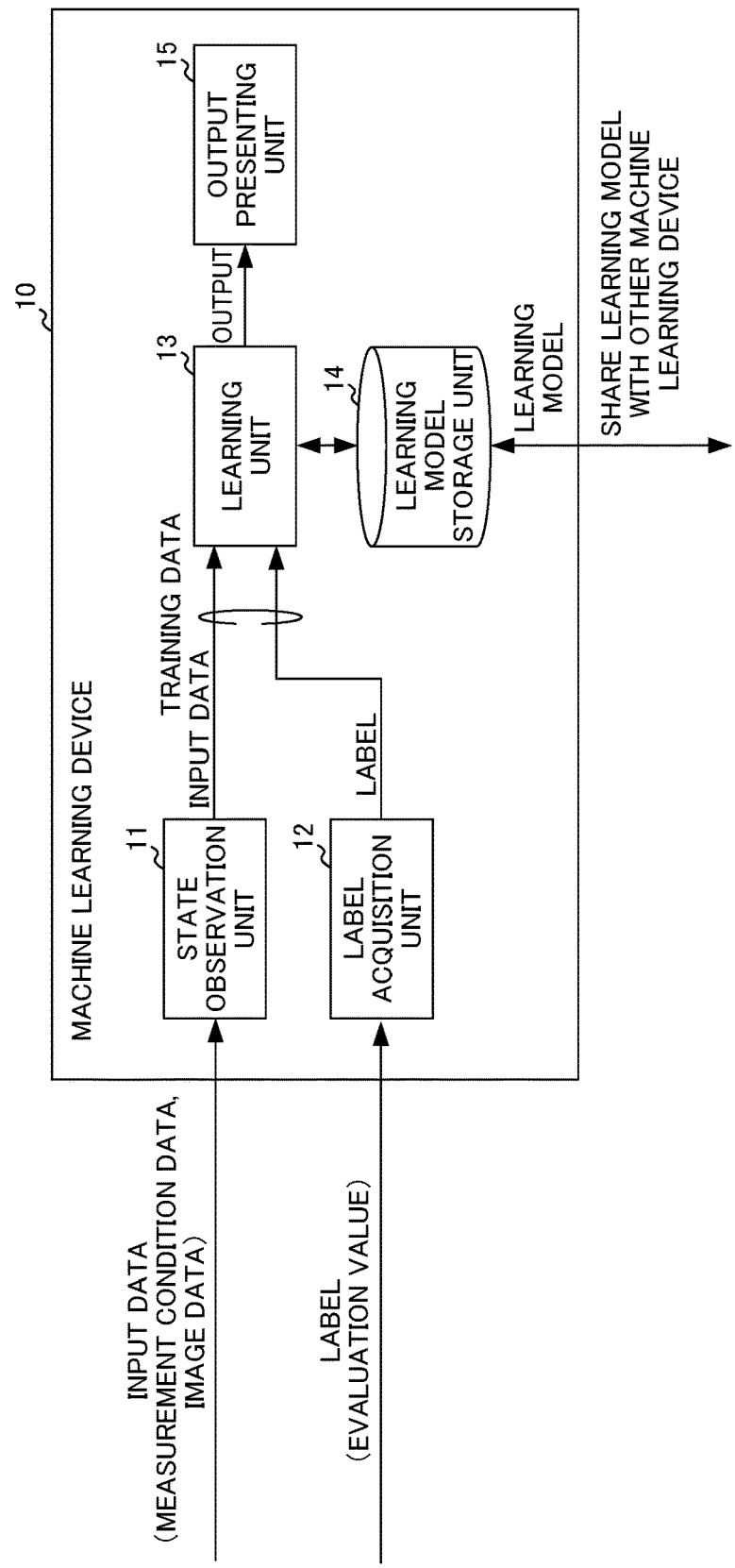
FIG. 6 is a functional block diagram illustrating a configuration of a machine learning device according to the embodiments of the present invention.

FIG. 5 illustrates six images obtained by imaging a burn pattern from three orthogonal directions of X, Y, and Z axes in the Cold and Hot modes. In the example illustrated in FIG. 5, in an image obtained by imaging a radiation surface from the Z-axis direction which is a traveling direction of the laser beam, the area of a burn pattern obtained in the Hot mode is larger than that in the Cold mode. In the images imaged from the Y and X-axis directions, the depth of a burn pattern obtained in the Hot mode is deeper than in the Cold mode. That is, the propagation characteristics of the laser beam are different depending on whether the beam mode is the Cold mode or the Hot mode.

As described above, the shape of the burn pattern is generally different depending on whether the beam mode is the Cold mode or the Hot mode. Particularly, when the shape is greatly different from the Cold mode to the Hot mode, it is highly likely that the internal mirror of the laser oscillator 21 has deteriorated. That is, by comparing the shapes of the burn patterns obtained in the Cold and Hot modes, it is possible to perform quality judgment on whether the internal mirror of the laser oscillator 21 has deteriorated. Therefore, in the present embodiment, machine learning is performed using six pieces of image data in total obtained by imaging in three directions in the Cold and Hot modes as illustrated in FIG. 5 as the input data. However, although the details will be described in <Modification 1>, machine learning can be performed using the image data obtained in either the Cold mode or the Hot mode only.

The warming state of the laser machine 20 is not the only factor that affects the shape of a burn pattern. For example, a difference in an observation condition such as the type of a laser oscillator, a radiation period of a laser beam, and the distance from a beam emitting aperture of the laser oscillator to an observation point of the intensity distribution also have an influence on the burn pattern shape. Therefore, machine learning is performed using these observation conditions as input data.

Functional Blocks of Machine Learning Device 10

Next, the functional blocks included in the machine learning device 10 in order to perform machine learning using such input data will be described. The machine learning device 10 includes a state observation unit 11, a label acquisition unit 12, a learning unit 13, a learning model storage unit 14, and an output presenting unit 15.

The state observation unit 11 is a part that acquires the observation condition and the image data from the laser machine 20 and the imaging device 30, respectively, as input data and outputs the acquired input data to the learning unit 13. Here, the input data in the present embodiment includes the observation condition acquired from the laser machine 20 and the image data acquired from the imaging device 30 as described above. These pieces of data will be described in detail.

As described above, the observation condition includes, for example, the type of a laser oscillator, a radiation period of a laser beam, and the distance from a beam emitting aperture of the laser oscillator to an observation point of the intensity distribution. The state observation unit 11 may acquire all of these pieces of information as the input data and may acquire some pieces of data as the input data.

The type of a laser oscillator is an identifier or the like for identifying the type of the laser oscillator 21, for example. Since the focusing performance and the propagation characteristics of the laser beam are different depending on the type of the laser oscillator and have an influence on the burn pattern shape, the type of the laser oscillator is used as the observation condition.

The radiation period of a laser beam is a value indicating a period for which a laser beam is radiated to the acrylic block 40. Since the burn pattern shape changes depending on the radiation period of the laser beam, the radiation period of a laser beam is used as the observation condition. The radiation period of a laser beam is approximately 1 to 4 seconds, for example.

The distance from the beam emitting aperture of a laser oscillator to an observation point of the intensity distribution is a value indicating a distance. Since a carbon dioxide laser propagates while spreading slightly, the burn pattern shape changes depending on the distance. Therefore, the distance is used as the observation condition. The distance is approximately several meters, for example.

In general, in quality judgment of the laser beam intensity distribution, the laser beam intensity distribution is judged to be good when the shape of a laser beam when seen in a plan view from the traveling direction of the laser beam is round, the laser beam when seen from the traveling direction of the laser beam is symmetrical, and no interference fringe is observed. However, the quality judgment of the laser beam is not sufficient with these general criteria, and the intensity distribution appropriate for the laser beam is different if the observation conditions are different. Therefore, in the present embodiment, machine learning is performed using the above-described observation condition as the input data.

A user who observes the intensity distribution understands these observation conditions and inputs these observation conditions to the laser machine 20 or the machine learning device 10 together with the image data, for example. The state observation unit 11 acquires the input observation conditions. In the site such as a factory where the laser machine 20 is installed, when the observation condition is the same every time, the observation condition may be prepared as a database in advance so that the user selects the observation condition from the database. In this way, it is possible to eliminate the time and effort of the user inputting the observation condition. In such a factory, it is possible to acquire a number of pieces of training data for the same observation condition.

Next, the image data will be described. As described above, the image data is generated by the imaging device 30 imaging the burn pattern on the acrylic block 40. The state observation unit 11 acquires the image data generated by imaging from the imaging device 30.

The label acquisition unit 12 is a part that acquires the evaluation value from the laser machine 20 as a label and outputs the acquired label to the learning unit 13. Here, the evaluation value in the present embodiment is an evaluation value related to quality judgment and is a value indicating whether the intensity distribution of the laser beam is appropriate and the laser beam can be used as it is (that is, "good") or the intensity distribution of the laser beam is not appropriate and the laser beam cannot be used as it is (that is, "defective").

The evaluation value is determined on the basis of the judgment of a user who visually observes the burn pattern itself formed on the acrylic block 40 or the image data obtained by imaging the burn pattern. The user inputs the determined evaluation value to the laser machine 20 or the machine learning device 10, for example. The label acquisition unit 12 acquires the input evaluation value. Since it is necessary that the evaluation value is accurate, it is desirable that an expert operator makes judgment for determining the evaluation value.

The learning unit 13 receives a pair of the input data and the label as training data and performs supervised learning using the training data to construct a learning model. For example, the learning unit 13 performs supervised learning using a neural network. In this case, the learning unit 13 performs forward propagation in which the pair of the input data and the label included in the training data is input to a neural network formed by combining perceptrons and the weighting factors for the respective perceptrons included in the neural network are changed so that the output of the neural network is the same as the label.

In the present embodiment, the output of the neural network is classified into two classes of "good" and "defective", and a probability that the output is classified to a certain class is output. Forward propagation is performed such that the value of a probability of the quality of the laser beam intensity distribution output by the neural network (for example, a value of the probability of 90% that the quality is "good") is the same as the evaluation value of the label (for example, when the label indicates "good" in the quality, the value of the probability of "good" output by the neural network is 100%).

The learning unit 13 adjusts weighting factors so as to decrease the errors in the output of respective parameters by backpropagation (also referred to as an error back propagation) after performing forward propagation in this manner.

More specifically, the learning unit 13 calculates an error between the label and the output of the neural network and corrects the weighting factor so as to decrease the calculated error. In this manner, the learning unit 13 learns the characteristics of training data and obtains a learning model for estimating a result from an input recursively.

In the present embodiment, the image data generated by the imaging device 30 imaging the burn pattern formed on the acrylic block 40 is included in the input data. Therefore, the learning unit 13 may learn the characteristics of the image data using a convolutional neural network (CNN) which is a neural network suitable for learning the image data. Moreover, a learning model may be constructed using a neural network which receives both the characteristics of the observation condition learned by a neural network different from the convolutional neural network and the characteristics of the image data learned by the convolutional neural network. Alternatively, the learning model may be constructed using a neural network which receives both the observation condition itself and the characteristics of the image data learned by the convolutional neural network.

The learning unit 13 constructs a learning model by performing machine learning in the above-described manner. The learning model constructed by the learning unit 13 is output to the learning model storage unit 14.

The learning model storage unit 14 is a storage unit that stores the learning model constructed by the learning unit 13. When new training data is acquired after the learning model was constructed, the supervised learning may be added to the learning model stored in the learning model storage unit 14 and machine learning may be performed additionally so that the learning model already constructed is updated appropriately.

Although this additional learning may be performed automatically, learning may be performed on the basis of user's judgment. That is, when the user judges that the quality judgment based on the learning model is wrong, the user may determine the observation condition and the evaluation value according to the user's own criteria so that the quality judgment is more accurate to thereby generate training data and perform additional learning. Moreover, addition learning may be performed when the arrangement of the laser oscillator 21 in the laser machine 20 is changed and the place where the acrylic block 40 can be placed is changed. By performing such additional learning, it is possible to construct a learning model according to the user's own judgment criteria.

The output presenting unit 15 is a part that presents the output of the learning unit 13. As described above, in the present embodiment, since the result of the quality judgment on the acrylic block 40 can be output by the learning model constructed by the learning unit 13, the output presenting unit 15 presents the content of the output of the learning unit 13 to the user. The presentation may be performed, for example, by displaying information on a liquid crystal display or the like or by printing information on a paper medium, and may be performed by outputting sound (for example, a warning sound may be output when the quality judgment result shows that the possibility of "defective" is high).

Hereinabove, the functional blocks included in the machine learning device 10 have been described. In order to realize these functional blocks, the machine learning device 10 includes an arithmetic processing device such as a central processing unit (CPU). Moreover, the machine learning device 10 includes an auxiliary storage device such as a hard disk drive (HDD) storing various control programs such as application software and an operating system (OS) and a main storage device such as a random access memory (RAM) for storing data which is temporarily necessary for an arithmetic processing device to execute programs.

In the machine learning device 10, the arithmetic processing device reads application software and an OS from the auxiliary storage device and performs an arithmetic process based on the application software and the OS while deploying the read application software and the OS on the main storage device. Various hardware components included in the respective devices are controlled on the basis of this arithmetic processing result. In this way, the functional blocks of the present embodiment are realized. That is, the present embodiment can be realized by cooperation of hardware and software.

As a specific example, the machine learning device 10 can be realized by incorporating application software for realizing the present embodiment into an ordinary personal computer or a server device. However, since the machine learning device 10 involves a large amount of arithmetic operations associated with supervised learning, the supervised learning may be processed at a high speed, for example, when a graphics processing unit (GPU) is mounted on a personal computer and the GPU is used for arithmetic processing associated with the supervised learning according to a technique called general-purpose computing on graphics processing units (GPGPU). Furthermore, in order to realize faster processing, a computer cluster may be constructed using a plurality of computers having such a GPU mounted thereon and parallel processing may be performed by a plurality of computers included in the computer cluster.

Figure 7:
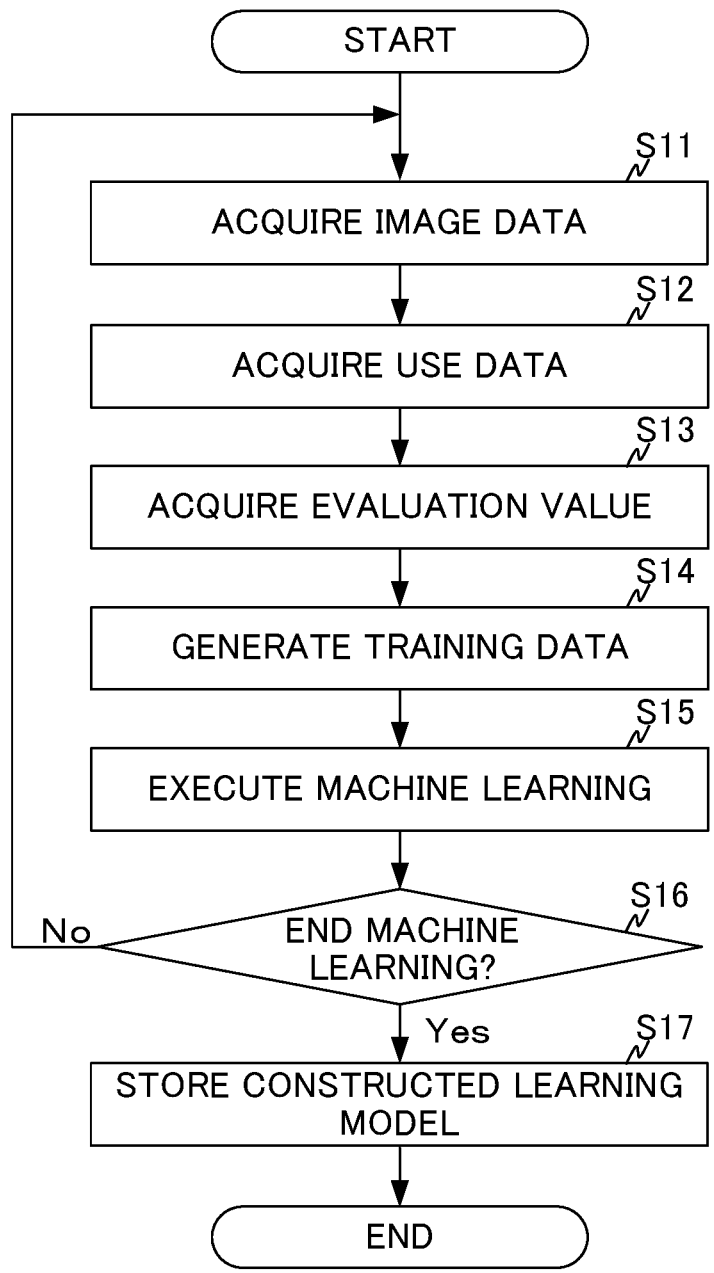
FIG. 7 is a flowchart illustrating an operation when constructing a learning model according to the embodiments of the present invention.

Next, an operation during supervised learning of the machine learning device 10 will be described with reference to the flowchart of FIG. 7. In step S11, the state observation unit 11 acquires image data obtained by imaging the burn pattern formed on the acrylic block 40 from the imaging device 30. The state observation unit 11 outputs the acquired image data to the learning unit 13.

In step S12, the state observation unit 11 acquires the observation condition corresponding to the image data acquired in step S11. The state observation unit 11 outputs the acquired observation condition the learning unit 13.

In step S13, the label acquisition unit 12 acquires an evaluation value corresponding to the image data and the observation condition acquired by the state observation unit 11 in steps S11 and S12, respectively. The label acquisition unit 12 outputs the acquired evaluation value to the learning unit 13. Although, for the sake of convenience, steps S11 to S13 are described in that order, these three steps may be executed in a different order and may be executed in parallel.

In step S14, the learning unit 13 generates training data by paring the respective pieces of data input in steps S11, S12, and S13 with each other.

In step S15, the learning unit 13 performs machine learning on the basis of the training data created in step S14. This machine learning is supervised learning and a method thereof is the same as described in the description of the functional blocks of the learning unit 13.

In step S16, the learning unit 13 determines whether or not to end machine learning. This determination is performed on the basis of predetermined conditions. For example, learning ends when conditions that the value of an error between the label and the output of the neural network is equal to or smaller than a predetermined value or supervised learning has been repeated for a predetermined number of times are satisfied.

When the conditions for ending the machine learning are not satisfied, a determination result of No is obtained in step S16 and the process returns to step S11. The above-described processes are repeated for new input data and new labels. On the other hand, when the conditions for ending the machine learning are satisfied, a determination result of Yes is obtained in step S16 and the process proceeds to step S17.

In step S22, the learning unit 13 stores the learning model constructed by the learning in step S22 in the learning model storage unit 14. By the operations described above, the learning unit 13 performs supervised learning using input data including the observation condition of the acrylic block 40 and the image data to construct a learning model. In this way, it is possible to construct a learning model for performing quality judgment of the laser beam intensity distribution by taking the observation condition of the burn pattern into consideration.

The above-described operations may be performed as a process for constructing a learning model and may be performed when maintenance is performed as usual on the laser machine 20 in a factory or the like.

Although the supervised learning is performed by online learning, the supervised learning may be performed by batch learning or mini-batch learning. Online learning is a learning method in which supervised learning is performed whenever training data is created. Moreover, batch learning is a learning method in which a plurality of pieces of training data are collected while training data is created repeatedly, and supervised learning is performed using all pieces of collected training data. Furthermore, mini-batch learning is a learning method which is intermediate between online learning and batch learning and in which supervised learning is performed whenever a certain amount of training data is collected.

Figure 8:
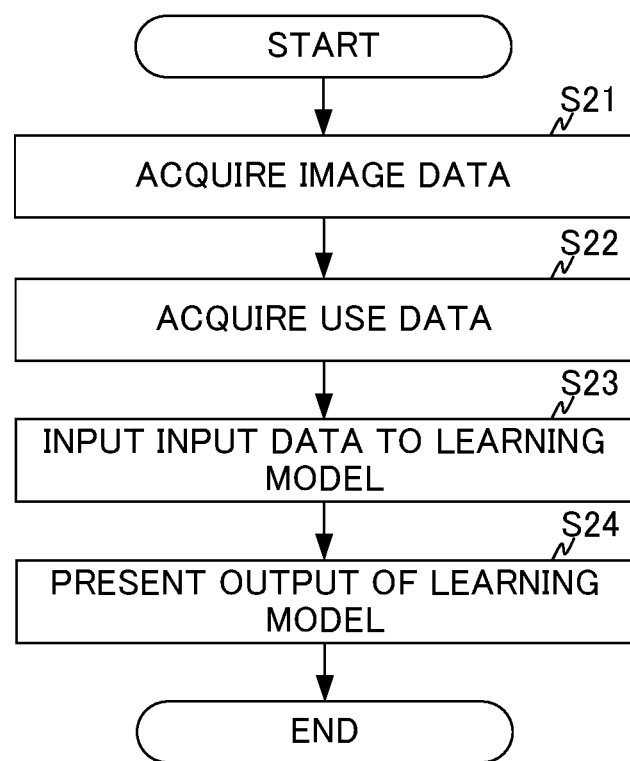
FIG. 8 is a flowchart illustrating an operation when using a learning model according to the embodiments of the present invention.

Next, an operation when quality judgment is performed using the learning model constructed in this manner will be described with reference to the flowchart of FIG. 8. In step S21, the state observation unit 11 acquires the image data obtained by imaging the burn pattern formed on the acrylic block 40 from the imaging device 30. The state observation unit 11 outputs the acquired image data to the learning unit 13.

In step S22, the state observation unit 11 acquires the observation condition corresponding to the image data acquired in step S11. The state observation unit 11 outputs the acquired observation condition to the learning unit 13. Similarly to steps S11 to S13, steps S21 and S22 may be executed in a different order and may be executed in parallel.

In step S23, the learning unit 13 inputs the respective pieces of data input in steps S21 and S22 to the learned learning model stored in the learning model storage unit 14 as input data. The learning unit 13 outputs the output of the learning model corresponding to this input to the output presenting unit 15. The output presenting unit 15 presents the output of the learning model input from the learning unit 13 to the user as the result of the quality judgment.

By the operations described above, the machine learning device 10 can judge the quality of the laser beam intensity distribution by taking the observation condition of the burn pattern into consideration. Moreover, the user can determine whether it is necessary to replace an internal mirror or the like of the laser oscillator 21 by referring to the presented result of quality judgment. In this way, it is possible to automate quality judgment without requiring the user's judgment based on visual observation which was conventionally performed whenever judgment is performed. Moreover, it is possible to model the conventional obscure judgment criteria and to indicate the judgment results as numerical values.

Second Embodiment

Next, a second embodiment will be described. Since the first and second embodiments have the same basic configuration, redundant description of the common parts will be omitted, and the difference between the first and second embodiments will be described in detail. In the first embodiment, the learning unit 13 performs machine learning using the image data of the burn pattern formed on the acrylic block 40 as the input data. As a modification, the state observation unit 11 may acquire data of the intensity distribution observed by other observation means such as a beam profiler and the learning unit 13 may perform machine learning using the data of the intensity distribution as the input data.

In general, since beam profilers for industrial $CO_2$ lasers are expensive, when the observation target is a $CO_2$ laser, observation is performed using the acrylic block 40 as in the first embodiment. In contrast, when the object target is a YAG laser or a fiber laser, since it is not possible to perform observation using the acrylic block 40 due to a difference in wavelength range and the light receiving element is cheaper than that of the $CO_2$ laser, a beam profiler is often used for observation. Therefore, the present embodiment may be used when the observation target is a YAG laser or a fiber laser.

The output of a beam profiler has such a format that a numerical value corresponding to a light intensity is inserted to each cell obtained by dividing a plane (an XY plane) vertical to the traveling direction (the Z-direction) of a laser beam into a plurality of cells (for example, 128×128 cells). In this modification, the state observation unit 11 acquires the output of the beam profiler and the observation condition as the input data. In this way, even when the observation target is a YAG laser or a fiber laser, it is possible to construct a learning model for performing quality judgment of a laser beam.

In the first embodiment, since the burn pattern shape is different depending on a radiation period of a laser beam, the radiation period of the laser beam is included in the observation condition. However, when observation is performed using a beam profiler, since the radiation period of a laser beam does not affect the observation result, the radiation period of the laser beam may be excluded from the observation condition.

The number of divisions of the XY plane may be different depending on a difference in model or setting of a beam profiler. Therefore, the output data of a beam profiler may be pre-processed before it is input to a learning model so that the output data is converted to correspond to a predetermined number of divisions. For example, when output data in which the XY plane is divided into 128×128 cells and output data in which the XY plane is divided into 64×64 cells are present, the output data corresponding to the 64×64 cells may be further divided by pre-processing so as to correspond to the output data corresponding to the 128×128 cells. In this manner, by converting the format of the output data of the beam profiler by pre-processing, it is possible to construct a learning model even when the model or the setting of the beam profiler is different.

In the present embodiment, the image of 3-dimensional shape data generated on the basis of the observation result of the beam profiler may be treated as image data and machine learning may be performed using the image data as the input data.

Cooperation of Hardware and Software

Each of the devices included in the machine learning system can be realized by hardware, software, or a combination thereof. Moreover, the machine learning method performed by the cooperation of the respective devices included in the machine learning system can be realized by hardware, software, or a combination thereof. Here, being realized by software means being realized when a computer reads and executes a program.

The programs can be stored on any of various types of non-transitory computer readable media and be provided to a computer. The non-transitory computer readable media include various types of tangible storage media. Examples of the non-transitory computer readable media include a magnetic recording medium (for example a flexible disk, a magnetic tape, and a hard disk drive), a magneto-optical recording medium (for example a magneto-optical disk), a CD-ROM (Read Only Memory), a CD-R, a CD-R/W, a semiconductor memory (for example a mask ROM, a PROM (Programmable ROM), an EPROM (Erasable PROM), a flash ROM, and a RAM (Random Access Memory)). The programs may be provided to a computer by using any of various types of transitory computer readable media. Examples of the transitory computer readable media include electric signals, optical signals and electromagnetic waves. A transitory computer readable medium can provide programs to a computer through a wired communication path such as an electrical cable, optical fiber, or the like or a wireless communication path.

Modification of Embodiment

Although the respective embodiments are preferred embodiments of the present invention, the scope of the present invention is not to be limited to the afore-mentioned respective embodiments, the respective embodiments may be combined with each other and various modifications may be made without departing from the gist of the present invention.

Modification 1

In the above-described embodiments, the learning unit 13 performs machine learning using the image data of six images obtained by imaging a burn pattern from three orthogonal directions of X, Y, and Z axes in the Cold and Hot modes as the input data. The number of pieces of image data used as the input data may be reduced. For example, machine learning may be performed using three images obtained by imaging a burn pattern from three orthogonal directions of X, Y, and Z axes in either the Cold or Hot mode as the input data.

Moreover, the present invention may accept various cases such as "case where three images obtained in the Cold mode are used as input data", "case where three images obtained in the Hot mode are used as input data, and "case where six images obtained in the Cold and Hot modes are used as input data". When these cases are accepted, a learning model can be constructed by adding, to the observation condition, information for identifying whether the images included in the input data are images obtained in the Cold mode, images obtained in the Hot mode, or images obtained in the Cold and Hot modes. Alternatively, one learning model may be constructed for each of these cases.

Modification 2

In the respective embodiments described above, although the functions included in each of the machine learning device 10, the laser machine 20, and the imaging device 30 are realized by separate devices, some or all of these functions may be realized by an integrated device.

Moreover, one machine learning device 10 may be connected to a plurality of laser machines 20 and a plurality of imaging devices 30. Moreover, one machine learning device 10 may perform learning on the basis of the training data acquired from a plurality of laser machines 20 and a plurality of imaging devices 30. Furthermore, in the above-described embodiments, although one machine learning device 10 is illustrated, a plurality of machine learning devices 10 may be present. That is, the relation between the machine learning device 10 and the laser machine 20 and the imaging device 30 may be one-to-one relation and may be one-to-multiple relation or multiple-to-multiple relation.

Modification 3

As described in Modification 2, when a plurality of machine learning devices 10 is present, a learning model stored in the learning model storage unit 14 of any one of the machine learning devices 10 may be shared between other machine learning devices 10. When the learning model is shared between a plurality of machine learning devices 10, since supervised learning can be performed by the respective machine learning devices 10 in a distributed manner, the efficiency of supervised learning can be improved.

Modification 4

In the above-described embodiments, although the evaluation value is determined by the judgment of a user who visually observes the burn pattern formed on the acrylic block 40, the evaluation value may be determined on the basis of the result of actually using the laser beam. In this case, the user actually performs laser processing using the laser machine 20 after imaging the acrylic block 40 using the imaging device 30. The user determines the evaluation value on the basis of the result of the laser processing actually performed. In this way, it is possible to determine the evaluation value more accurately.

In this case, the machine learning device 10 may determine the evaluation value automatically on the basis of an inspection result of a work cut by the laser cutting actually performed. Therefore, the machine learning device 10 is connected to an inspection device that inspects whether the criteria such as the quality of a cutting surface of the cut work are satisfied, for example. The machine learning device 10 receives an inspection result from the inspection device. The machine learning device 10 determines the evaluation value as "good" upon receiving an inspection result that the criteria such as the quality of a cutting surface of the cut work are satisfied. On the other hand, the machine learning device 10 determines the evaluation value as "defective" upon receiving an inspection result that the criteria such as the quality of a cutting surface of the cut work are not satisfied. In this way, it is possible to eliminate the time and effort of the user inputting the evaluation value.

EXPLANATION OF REFERENCE NUMERALS

1: Machine learning system
10: Machine learning device
11: State observation unit
12: Label acquisition unit
13: Learning unit
14: Learning model storage unit
15: Output presenting unit
20: Laser machine
21: Laser oscillator
22: Laser emitting aperture
23: First reflection mirror
24: Second reflection mirror
25: Third reflection mirror
26: Fourth reflection mirror
27: processing head
28: Fifth reflection mirror
29: focusing lens
30: Imaging device
40: Acrylic block
41: Burn pattern
50: Light guiding path
60: Work
61: Movable table

What is claimed is:

1. A machine learning device comprising:
    a state observing means that acquires data indicating an intensity distribution of a laser beam and data indicating a condition for observing the laser beam, performed to generate the data indicating the intensity distribution as input data;
    a label acquisition means that acquires an evaluation value related to judgment of the quality of the laser beam as a label; and
    a learning means that performs supervised learning using a pair of the input data acquired by the state observing means and the label acquired by the label acquisition means as training data to construct a learning model for judging the quality of the laser beam.

2. The machine learning device according to claim 1, wherein the data indicating the intensity distribution is image data obtained by imaging a laser receiving portion of a radiation target radiated with the laser beam.

3. The machine learning device according to claim 2, wherein the image data includes a plurality of pieces of image data obtained by imaging the laser receiving portion from a plurality of directions.

4. The machine learning device according to claim 1, wherein the data indicating the intensity distribution is generated by observing the laser beam using a beam profiler.

5. The machine learning device according to claim 1, wherein the data indicating the condition for observing the intensity distribution includes at least any one of model information of a laser oscillator that radiates the laser beam, information on a temperature state of the laser oscillator, information indicating a radiation period of the laser beam, and information indicating a distance from a beam emitting aperture of the laser oscillator to an observation point of the intensity distribution.

6. The machine learning device according to claim 1, wherein the evaluation value is determined on the basis of the judgment of a user referring to a laser receiving portion of a radiation target radiated with the laser beam or an observation result of the laser beam by a beam profiler.

7. The machine learning device according to claim 1, wherein the laser beam is a laser beam used in a device associated with laser processing, and the learning means performs additional learning depending on an arrangement of a laser oscillator that radiates the laser beam, in the device associated with the laser processing.

8. The machine learning device according to claim 1, wherein the laser beam is a laser beam used in a device associated with laser processing, and
    the learning model constructed by the learning means is a learning model that outputs a value of a probability indicating whether the laser beam satisfies predetermined criteria when the data indicating the intensity distribution of the laser beam and the data indicating the condition for observing the intensity distribution are used as the input data.

9. A machine learning system including a plurality of machine learning devices according to claim 1, wherein
    the learning means each included in the plurality of machine learning devices shares the learning model, and the learning means each included in the plurality of machine learning devices performs learning on the shared learning model.

10. A machine learning method performed by a machine learning device, comprising:
    a state observing step of acquiring data indicating an intensity distribution of a laser beam and data indicating a condition for observing the laser beam, performed to generate the data indicating the intensity distribution as input data;
    a label acquisition step of acquiring an evaluation value related to judgment of the quality of the laser beam as a label; and
    a learning step of performing supervised learning using a pair of the input data acquired in the state observing step and the label acquired in the label acquisition step as training data to construct a learning model for judging the quality of the laser beam.

* * * * *